Oct. 20, 1942.   W. A. RAY   2,299,654
MANUAL RESET VALVE
Original Filed Oct. 26, 1938
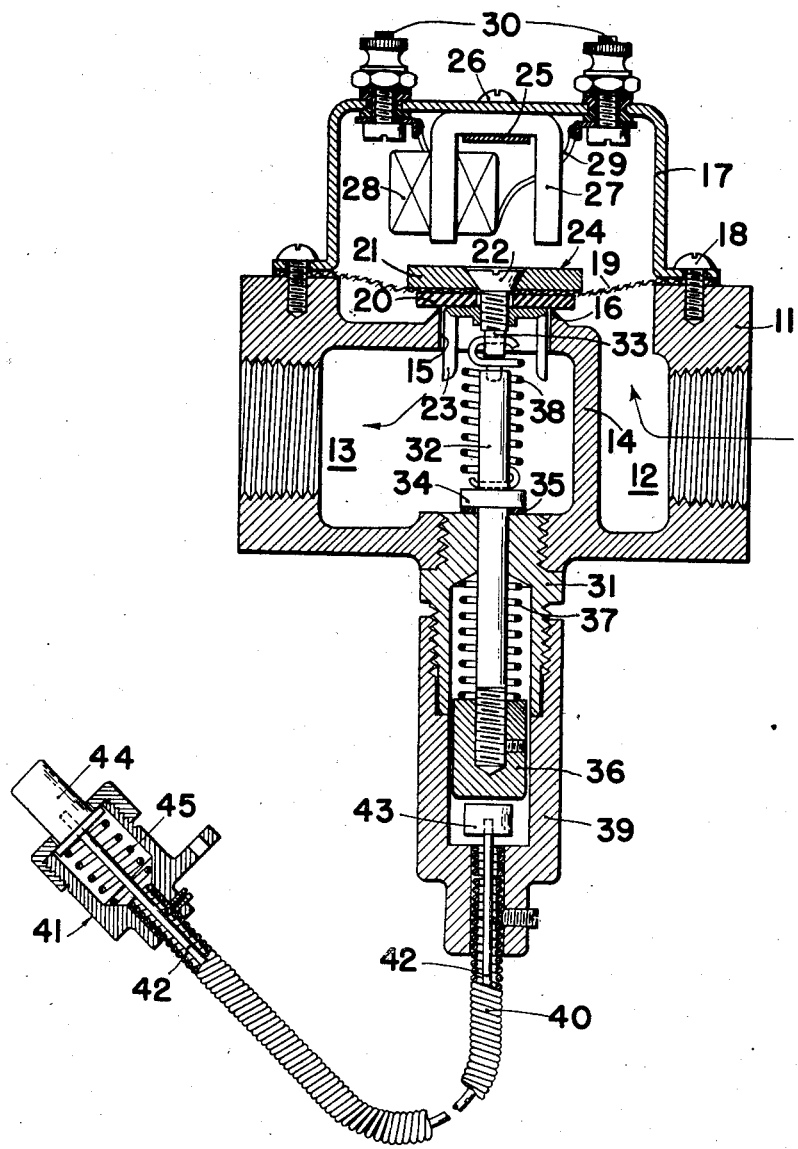
William A. Ray
INVENTOR.
BY John H. Rouse
ATTORNEY.

Patented Oct. 20, 1942

2,299,654

UNITED STATES PATENT OFFICE 2,299,654

MANUAL RESET VALVE

William A. Ray, Glendale, Calif.

Continuation of application Serial No. 237,029, October 26, 1938. This application February 21, 1941, Serial No. 379,980

11 Claims. (Cl. 137—139)

This application is a continuation of my copending application Serial No. 237,029, filed October 26, 1938.

My present invention relates to fluid control valves and particularly to the type of valves known as "manual-reset" which, as the name implies, must be manually reset to one position subsequent to the failure of the energizing force tending to maintain the valve in the other position.

Such a valve has utility in applications in which, after failure of a normal condition, such as line current supply or pilot burner flame, the attention of an operator is desirable before the operation of the system or device is resumed.

A chief object of my invention is to provide a valve of the type described which is simple and efficient and which comprises a minimum number of parts.

A further object of my invention is the provision in such a valve of novel and effective flexible means for guiding a valve member and a controlling member therefor.

A further object of my invention is the provision of a fluid permeable filtering diaphragm for guiding a valve member and its controlling member and also for protecting parts of the valve from undesirable components of the fluid controlled.

A further object of my invention is the provision of resilient means for biasing the valve member to move to the desired position on failure of the controlling condition and which is only fully effective upon the return of the resetting means to unoperated position.

A still further object is the provision in a manual reset valve of remote means for resetting the valve.

Other objects and advantages of my invention will be found in the description, the drawing and the appended claims.

For a complete understanding of the invention, reference may be had to the following detailed description and the accompanying drawing in which the single figure is a sectional view of a valve embodying my invention.

In the drawing, the numeral 11 denotes a valve body having an inlet 12 and an outlet 13 separated by a partition 14 which is provided with a valve port 15 and a valve seat 16. Covering an opening in the upper wall of the valve body is a housing 17 secured to the body, as by screws 18, with a flexible diaphragm member 19 therebetween, which may preferably be of fluid permeable material such as fabric or porous leather.

A valve member 20, cooperable with the seat 16 to control fluid flow through the valve, and an armature 21 of magnetic material are secured on opposite sides of said diaphragm by a screw 22 threaded into a valve guide 23, loosely slidable in the port 15. The elements 20, 21, 22 and 23 constitute a valve member assembly which is generally indicated by the numeral 24.

Secured to the upper wall of the housing 17 by a bracket 25 and screws 26 is a U-shaped core 27 carrying on one arm an energizing coil 28 which is connected by wires 29 to external terminals 30, insulatingly mounted in the housing.

Slidable in a hollow extension 31, threadedly received in the bottom of the valve body, is a reset plunger 32, cooperable with the reduced lower end portion 33 of the screw 22 to move the assembly 24 to open the valve. Limiting downward movement of the plunger 32 is a shoulder 34 formed thereon. A sealing washer 35 is provided to prevent possible leakage of fluid below the shoulder and around the lower portion of stem 32 when the valve is open. Threadedly secured to the lower end portion of the reset plunger 32, for manual operation thereof, is a push button 36. A spring 37, compressed between said button and the upper inside wall of extension 31, returns the plunger to the position shown after resetting. Secured at its opposite ends to the reset plunger and to the reduced lower end portion 33 of the screw 22 is a contractile spring 38, downwardly biasing the assembly 24.

A remote control device for the valve resetting means comprises a fitting 39 threadedly connectable to the extension 31, a hollow flexible cable 40, and an operating head 41. Slidable within the cable is a flexible operating wire 42, to one end of which is secured a member 43 and to the other end a manual push button 44. A compression spring 45 normally maintains the member 43 out of contact with the push button 36.

For operation of the valve, the core 27 may be energized by connecting the coil 28 to a suitable source of direct current. If the reset push button 36 is then operated to move the assembly 24 upwardly, bringing the armature 21 into contact with the core 27, upon release of the push button the armature will remain magnetically attracted to the core, holding the valve member 20 off the seat 16 against the bias of the spring 38. The valve will remain in this open condition until current through the coil is interrupted, when the assembly will be moved downwardly by the force of the spring 38 to close the valve. Force other than that of gravity is required to release the armature from its contact with the core as there is appreciable residual magnetism in all known magnetic materials.

When the energizing current is relatively weak, very even surface contact of the armature with the core faces is essential to maintain the armature in position. Small particles of dirt between the armature and the core may impair this contact. For that reason, I have provided the filtering diaphragm 19 which screens the magnetic members from dirt which may be present in the fluid controlled by the valve. With the use of artificial or natural gas, gummy deposits are often formed in apparatus through which the gas passes. These deposits, which would be harmful to the magnetic operation of the valve, are prevented by the diaphragm from passing into the housing which contains the magnetic members.

The diaphragm also serves as a very effective "full floating" guide for the assembly 24, putting no uneven strain on the armature in its held position, and also serving to accurately guide the valve member when the valve closes.

According to my invention, an impermeable diaphragm of light flexible material such as thin leather or rubber may be employed, especially when the area within the housing is relatively great so that pressure variation therein with movement of the valve assembly is small. However, I preferably employ a filtering diaphragm of material such as light strong fabric which permits free movement of the valve assembly and presents minimum of strain thereon.

The additional valve guide 23 is not essential to the operation of the valve but serves to prevent undue strain on the diaphragm in resetting if the alignment of the reset plunger with the valve assembly is not accurate, and also in shipment.

Magnetically operated reset valves of the prior art are provided with biasing means for releasing the armature, on cessation of current, which become fully effective upon initial release of the resetting means. Thus an instantaneous maximum force is applied which may jar the armature out of contact with the core. By the biasing means of my invention, this force is applied gradually and is not fully effective until the reset plunger is returned to its unoperated position. This results in improved resetting.

The reset plunger return spring 37 is arranged to exert much greater force than that of the valve assembly spring 38 so that the return of the reset plunger is not appreciably impeded thereby.

A suitable source of direct current for the operation of the valve may be provided by an alternating current rectifier supplied from the line. In the event of "line failure" the valve closes and remains closed until manually reset. Or, the rectified alternating current may be passed through a thermal cut-out responsive to a pilot flame. On extinction of the flame, the cut-out opens the electric circuit, closing the valve.

Another suitable source of current may be provided by a thermoelectric generating device. This, for example, may be heated by a pilot burner flame. On extinction of the flame, generation ceases and the valve closes.

The electromagnetic device is so arranged that it has sufficient power to hold the armature in contact with the core when it is energized but insufficient power to attract the armature when it is in the released position. This is easily arranged, as the power required to attract the armature, even through a short distance, is many times that required to hold the armature in contact with the core.

The remote control device shown has particular utility when the valve is installed in a location where the reset button is not readily accessible.

In the embodiment of my invention shown, the valve is normally closed. However, it is obvious that, by rearrangement of parts, a normally open valve may be constructed.

It is to be understood that the specific embodiment of my invention shown and described herein is for the purpose of illustration only, and my invention is to be limited therefore only by the scope of the appended claims.

I claim as my invention:

1. In a control device, an electromagnet comprising an armature member and a core member, said core member being adapted when energized to retain said armature member in engagement therewith when the members are first mechanically brought together, mechanically operable resetting means effective in its movement in one direction to move one of said members into engagement with the other, said resetting means being movable in another direction away from said one of said members while the members are magnetically retained in interengagement, means operated by the movement of said resetting means in said other direction for producing a force biasing said members apart, said last named means being so arranged that said force is a continuous function of the position of the resetting means over a substantial range of movement thereof.

2. In a control device, an electromagnet comprising an armature member and a core member, said core member being adapted when energized to retain said armature member in engagement therewith when the members are first mechanically brought together, mechanically operable resetting means effective in its movement in one direction to move one of said members into engagement with the other, said resetting means being movable in an opposite direction away from said one of said members while the members are magnetically retained in interengagement, means operated by the movement of said resetting means in said opposite direction for applying a force to said one of said members tending to move it away from the other member, said last named means being so arranged that said force is substantially continuously increased as said resetting means is moved in said opposite direction.

3. In a control device, an electromagnet comprising an armature member and a core member, said core member being adapted when energized to retain said armature member in engagement therewith when the members are first mechanically brought together, mechanically operable resetting means effective in its movement in one direction to move one of said members into engagement with the other, said resetting means being movable in an opposite direction away from said one of said members while the members are magnetically retained in interengagement, means operated by the movement of said resetting means in said opposite direction for applying a force to said one of said members tending to move it away from the other member, said last named means comprising a contractile spring connected at one of its ends to said one of said members and at its other end to said resetting means so that when said resetting means is moved in said opposite direction said force is gradually increased.

4. In a fluid control valve, in combination, a valve body having a port, means cooperable with said port and having an open and a closed position with respect thereto for controlling fluid flow through said valve, an electromagnet comprising an armature member and a core member, one of said members being connected to said fluid controlling means so as to move therewith, the other of said members being fixed with respect to said body, said core member being adapted when energized to magnetically hold said armature member only when the members are first mechanically brought into engagement with each other, manually operable resetting means effective in its movement in one direction to move said members into engagement with each other and said fluid controlling means to one controlling position, said resetting means being movable in another direction independently of said members while the same are magnetically retained in interengagement, means for biasing said members apart and said fluid controlling means toward its other controlling position, said biasing means being connected to said resetting means and so arranged that the force of said bias is increased substantially as a continuous function of the position of said resetting means as the same is moved in said other direction.

5. In a fluid control valve, in combination, a valve body having a port, means cooperable with said port and having an open and a closed position with respect thereto for controlling fluid flow through said valve, an electromagnet comprising an armature member and a core member, one of said members being connected to said fluid controlling means so as to move therewith, the other of said members being fixed with respect to said body, said core member being adapted when energized to magnetically hold said armature member only when the members are first mechanically brought into engagement with each other, manually operable resetting means effective in its movement in one direction to move said members into engagement with each other and said fluid controlling means to its open position, said resetting means being movable in an opposite direction independently of said members while the same are magnetically retained in interengagement, means for biasing said members apart and said fluid controlling means toward its open position, said biasing means being connected to said resetting means and so arranged that the force tending to move said members apart is substantially continuously increased as said resetting means is moved in said opposite direction.

6. In a fluid control valve, in combination, a valve body having a port, means cooperable with said port and having an open and a closed position with respect thereto for controlling fluid flow through said valve, an electromagnet comprising an armature member and a core member, one of said members being connected to said fluid controlling means so as to move therewith, the other of said members being fixed with respect to said body, said core member being adapted when energized to magnetically hold said armature member only when the members are first mechanically brought into engagement with each other, manually operable resetting means effective in its movement in one direction to move said one of said members into engagement with the other and said fluid controlling means to its open position, said resetting means being movable in an opposite direction away from said one of said members while the members are magnetically retained in interengagement, means for biasing said one of said members away from the other, said biasing means comprising a contractile spring connected at one of its ends to said one of said members and at its other end to said resetting means so that when said resetting means is moved in said opposite direction the force of said bias is gradually increased.

7. In a fluid control valve, in combination, a valve body having a port, a valve member assembly comprising a valve member cooperable with said port to control fluid flow through said valve and an armature of magnetic material secured to said valve member, a flexible diaphragm member secured to said body and said assembly and guiding the same, an electromagnetic device in said body and comprising a core and a coil for energizing said core, said core being adapted when energized to hold said armature in contact therewith when it is mechanically brought to that position, manually operated resetting means for moving said armature into contact with said core to open said valve, and a contractile spring secured at its opposite ends to said resetting means and to said assembly for moving said armature out of contact with said core when the same is unenergized to close said valve, said contractile spring being fully effective only when said resetting means is returned to normal position while the armature is magnetically held in contact with the core.

8. In a fluid control valve, in combination, a valve body having a port, a housing secured over an opening in said body, a flexible diaphragm covering said opening, a valve member in said body and cooperable with said port to control fluid flow through said valve, an armature of magnetic material within said housing and secured to said valve member with said flexible diaphragm therebetween, said diaphragm serving to guide said valve member and said armature, an electromagnetic device in said housing and comprising a core and a coil for energizing said core, said core being adapted when energized to hold said armature in engagement therewith when it is first mechanically brought to that position, manually operable resetting means for moving said armature into engagement with said core to open said valve, and a contractile spring connected at its opposite ends to said resetting means and to said valve member for moving said armature out of engagement with said core when the same is unenergized to close said valve, said contractile spring being fully effective only when said resetting means is returned to its normal position while the armature is magnetically held in contact with the core.

9. In a fluid control valve, in combination, a valve body having a port, a housing secured over an opening in said body, a flexible fluid-permeable diaphragm covering said opening, a valve member in said body and cooperable with said port to control fluid flow through said valve, an armature of magnetic material within said housing and secured to said valve member with said flexible diaphragm therebetween, said diaphragm serving to guide said valve member and said armature, an electromagnetic device in said housing and comprising a core and a coil for energizing said core, said core being adapted when energized to hold said armature in contact therewith when it is mechanically brought to that position, manually operated resetting means for moving said armature into contact with said core to open said valve, and a contractile spring secured at its opposite ends to said resetting means and to said valve member and armature for moving said armature out of contact with said core when the same is unenergized to close said valve, said contractile spring being fully effective only when said resetting means is returned to normal position while the armature is magnetically held in contact with the core.

10. In a fluid control valve, in combination, a valve body having a port, a housing secured over an opening in said body, a flexible fluid-permeable diaphragm covering said opening, a valve member in said body and cooperable with said port to control fluid flow through said valve, an armature of magnetic material within said housing and secured to said valve member with said flexible diaphragm therebetween, said diaphragm serving to guide said valve member and said armature, additional valve guide means comprising a member freely slidable in said port, an electromagnetic device in said housing and comprising a core and a coil for energizing said core, said core being adapted when energized to hold said armature in contact therewith when it is mechanically brought to that position, manually operated resetting means independent of said valve member and armature and normally biased to inoperative position for moving said armature into contact with said core to open said valve, and a contractile spring secured at its opposite ends with respect to said resetting means and to said valve member and armature for moving said armature out of contact with said core when the same is unenergized to close said valve, said contractile spring being fully effective only when said resetting means is returned to normal position by said bias while the armature is magnetically held in contact with the core.

11. In a fluid control valve, in combination, a valve body having a port, a housing secured over an opening in said body, a flexible fluid-permeable diaphragm covering said opening, a valve member in said body and cooperable with said port to control fluid flow through said valve, an armature of magnetic material within said housing and secured to said valve member with said flexible diaphragm therebetween, said diaphragm serving to guide said valve member and said armature, additional valve guide means comprising a member freely slidable in said port, an electromagnetic device in said housing and comprising a core and a coil for energizing said core, said core being adapted when energized to hold said armature in contact therewith when it is mechanically brought to that position, manually operated resetting means independent of said valve member and armature and normally biased to inoperative position for moving said armature into contact with said core to open said valve, a contractile spring secured at its opposite ends with respect to said resetting means and to said valve member and armature for moving said armature out of contact with said core when the same is unenergized to close said valve, said contractile spring being fully effective only when said resetting means is returned to normal position by said bias while the armature is magnetically held in contact with the core, and a remote control device for said resetting means detachably secured to said valve.

WILLIAM A. RAY.